United States Patent [19]

Williamson

[11] 4,398,565
[45] Aug. 16, 1983

[54] PIPE PLUGGING APPARATUS

[76] Inventor: Geronimo C. Williamson, 535 Lafayette Ave., Brooklyn, N.Y. 11205

[21] Appl. No.: 295,098

[22] Filed: Aug. 21, 1981

[51] Int. Cl.³ ............................................. F16L 55/12
[52] U.S. Cl. .................................................... 138/93
[58] Field of Search ..................... 138/90, 93, 94, 89, 138/91; 277/34; 285/107, 109, 236, 242, 243, 244; 134/167 C, 168 C

[56] References Cited

U.S. PATENT DOCUMENTS

| | | | |
|---|---|---|---|
| 827,835 | 8/1906 | White | 138/93 |
| 1,906,151 | 4/1933 | Goodman | 138/93 |
| 1,946,138 | 2/1934 | Gardner | 138/93 |
| 2,202,321 | 5/1940 | Schuldt | 138/93 |
| 2,309,429 | 1/1943 | Ahern | 138/93 |
| 2,336,450 | 12/1943 | Voorhess et al. | 138/93 X |
| 3,120,859 | 2/1964 | Wakley | 138/93 |
| 3,459,230 | 8/1969 | Smith | 138/93 |
| 3,498,333 | 3/1970 | Jones | 138/93 |
| 3,805,844 | 4/1974 | Bacon | 138/93 |
| 3,870,085 | 3/1975 | Schneider | 138/93 |

Primary Examiner—Stephen Marcus
Assistant Examiner—Mark John Thronson
Attorney, Agent, or Firm—Goodman & Teitelbaum

[57] ABSTRACT

An apparatus for plugging a pipe including an inflatable bag which is insertable into the pipe in a collapsed condition and which is inflatable therein to block the flow within the pipe. The bag is secured to a hollow tube having air outlet openings therein with the openings being positioned within the bag. A tubular member connects an air inlet opening of the hollow tube to an air compressor for transmitting compressed air through the hollow tube to thereby inflate the bag in order to plug the pipe. Preferably, an air valve is coupled between the air inlet opening of the hollow tube and the tubular member for controlling the flow of air into and out of the bag.

10 Claims, 5 Drawing Figures

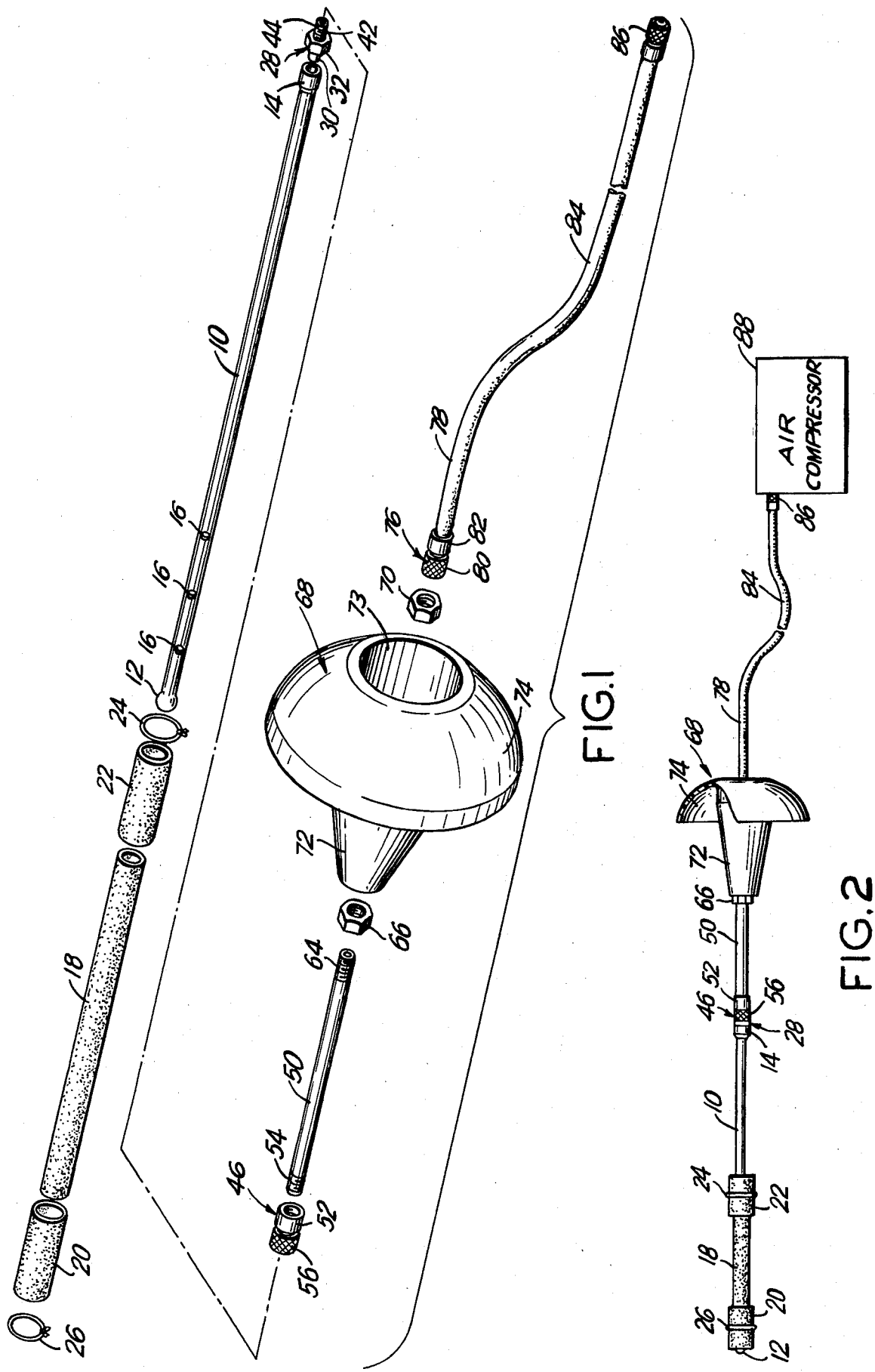

PIPE PLUGGING APPARATUS

BACKGROUND OF THE INVENTION

This invention relates to an apparatus for plugging up a pipe, and more particularly to an apparatus which can be utilized to seal off a water or gas main.

It is frequently necessary to seal off or plug up a pipe having a fluid flowing therein. For example, water or gas flow through pipes beneath the street level and feed into buildings. Although valves are positioned within the street to control the flow in the mains, in many cases a break will occur at the entry into the building and it is necessary to break up the street in order to shut off the flow.

In other situations, when a house is abandoned, it is necessary to cut off the flow of water or gas from the street. In order to do that, breaking up of the street is often necessary. A similar situation occurs when there is a water or gas break in the main beneath the street and a considerable amount of destructive work is needed in order to stop the flow of water or gas before the pipes can be repaired.

It would be beneficial if there could be provided a plugging device that can be inserted within the pipe or main so that it can plug up the pipe at any location desired.

SUMMARY OF THE INVENTION

Accordingly, it is an object of the present invention to provide a plugging apparatus which can be inserted within a pipe and can stop the flow from the pipe.

Another object of the present invention is to provide an apparatus which can be placed at the outlet of a pipe for plugging and sealing off the pipe.

A further object of the present invention is to provide an apparatus for plugging a pipe, which apparatus can be easily installed and readily utilized.

Yet another object of the present invention is to provide an inflatable bag which can be easily inserted within a pipe and quickly inflated for sealing off the pipe.

Still a further object of the present invention is to provide an apparatus which can be used to plug up a pipe while water is flowing from the pipe.

Yet a further object of the present invention is to provide a plugging device which can be installed within a pipe and maintained in place until such time as the pipe needs to be closed off, at which time it could be readily activated to seal off the pipe.

Another object of the present invention is to provide an apparatus for plugging up a pipe which can be inserted in situ and used to plug up the pipe without having to turn off the flow prior to installation of the plugging apparatus.

Briefly, in accordance with the present invention, there is provided an apparatus for plugging a pipe, which includes an inflatable bag which can be inserted into the pipe in a collapsed condition and then inflated in order to block off the flow within the pipe. A hollow tube having an air input and an air outlet is connected to the inflatable bag with the air outlet contained within the bag. A connecting tube interconnects the air input of the hollow tube with an air compressor for transmitting compressed air through the hollow tube in order to inflate the bag, thereby plugging the pipe. Suitable valves are coupled within the apparatus to control the flow of air from the air compressor into the bag.

In an embodiment of the present invention, the hollow tube is closed at one end and includes a plurality of openings longitudinally spaced along the hollow tube. The inflatable bag includes an elastic sleeve provided around the hollow tube so that the sleeve covers the openings. The end portions of the sleeve are secured onto the hollow tube.

In order to avoid damage from the flow coming out of the pipe while installing the apparatus and inflating the bag, a dish-like guard member can be positioned along that part of thwe connecting tube which is coaxial with the hollow tube. A portion of the connecting tube upstream of the guard member can be offset from the hollow tube in order to position the air compressor out of the direct flow coming from the pipe.

In one form of the invention, the connecting tube is perpendicular to the hollow tube so that the hollow tube with the sleeve around it can be permanently installed in a street main or pipe, with the connecting tube extending upwardly to the street level. The apparatus is then continuously available for use whenever it is desired to plug up the pipe.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective exploded view of the parts forming the apparatus of the present invention;

FIG. 2 is a side elevational view showing the apparatus in its assembled condition;

In the various figures of the drawing, like reference characters designate like parts.

DETAILED DESCRIPTION OF THE PREFERRED EMBODIMENT

Figure 3:
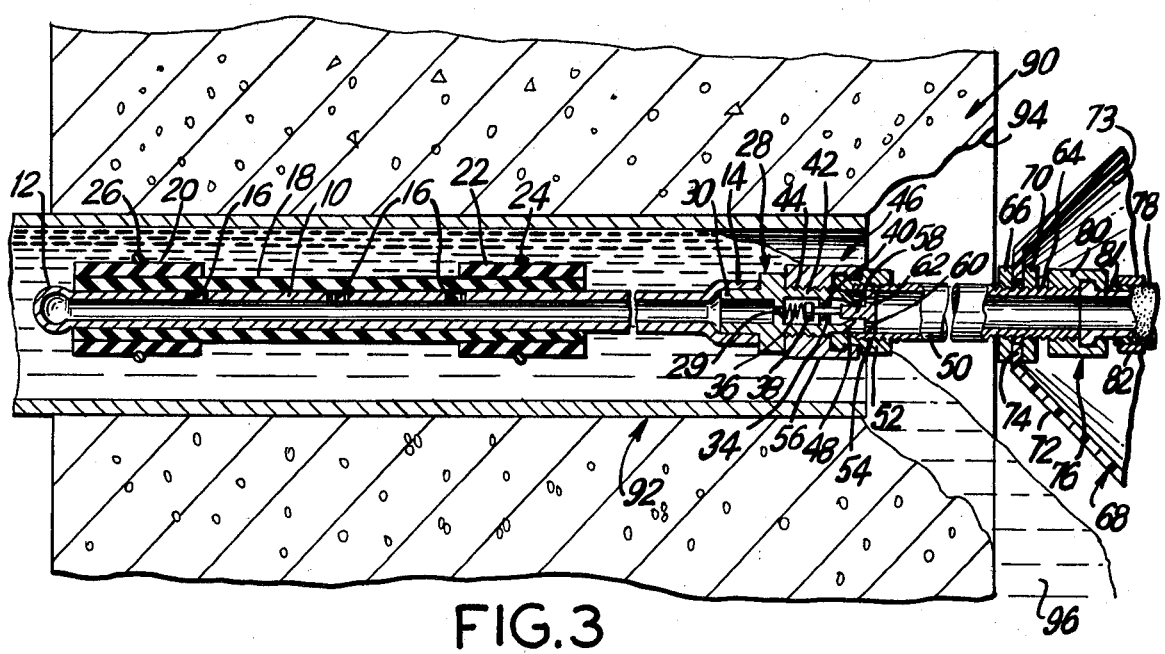
FIG. 3 is a sectional elevational view showing the apparatus installed in a pipe and ready for inflation of the bag.

Referring now to the drawings, particularly FIGS. 1 and 2, the apparatus of the present invention comprises a hollow tube 10 having one closed end with an enlarged head 12 and an opposite open end with a bell shaped head or mouth 14. A plurality of spaced apart openings 16 are longitudinally spaced from the closed end head 12.

Positioned on the tube 10 so as to at least cover the openings 16, is a sleeve 18 formed of elastic material. The sleeve is positioned slightly away from the enlarged head 12 so that the head 12 serves as a stop to prevent any sliding off of the sleeve. Typically, the sleeve 18 can be formed of any elastic material which can inflate upon application of air therein. Preferably, synthetic rubber such as GRS or GR-S can be utilized. However, other suitable materials can also be used.

The opposing ends of the sleeve 18 are secured onto the hollow tube 10 by means of elastic bands 20, 22 which overlie the end portions of the sleeve 18, and conventional clamping rings 24, 26 are clamped around the bands 20, 22. It has been preferably found that the clamping rings 24, 26 should be placed inward of the ends of the bands to prevent pullout of the sleeve 18 from under the bands 20, 22 during inflating of the sleeve. The bands 20, 22 protect the sleeve from the clamping rings 24, 26 so that the clamping rings do not tear or cut the sleeve 18 when the sleeve is inflated, wherein the bands limit the inflation of the sleeve adjacent to the clamping rings.

In the bell shaped mouth 14, there is secured a valve member 28 comprising a stem portion 30 which is secured into the bell shaped mouth and a nut 32 forming a flange around the stem portion 30. The valve member is shown best in FIG. 3 as a typical air valve including a piston having a piston head 38 and a plunger 34 which extends through the valve opening 40. The piston is biased in the closed position by means of the spring 36 held against the forward surface of the nut 32. An opening 29 is formed in the nut for passage of air. The piston head 38 is prevented from passing out of the housing 42 which contains the air valve, by means of an inwardly directed wall in which is formed the valve opening 40. The exterior of the housing 42 is threaded at 44 in order to receive a coupling member 46 interconnecting the air valve to a connecting tube. The front end of the housing 42 is tapered at 48.

By means of the coupling member 46, a connecting tube 50 is connected to the hollow tube 10. The coupling member 46 can typically be any of various types of coupling members. It is shown to include a first internally threaded nut 52 which screws onto thwe threads 54 of the connecting tube 50, and another internally threaded nut 56 rotatably coupled in a conventional manner to the nut 52, which threads onto the externally threaded portion 44 of the valve housing 42.

A male member 58 extends from the forward end of the connecting tube 50, as shown in FIG. 3. The male member 58 enters the tapered front end 48 of the housing 42 and pushes the plunger 34 counter to the biasing spring 36, thereby opening the valve opening 40. Side openings 60, 62 are provided in the flange portion of the male member 58 to permit the passage of the air from the connecting tube 50 to the hollow tube 10.

The other end of the connecting tube 50 is also threaded at 64. A guard member 68 is placed onto the threaded end 64 of the connecting tube 50 and is held in place by means of respective internally threaded nuts 66, 70 positioned on either side of the guard member 68. The guard member 68 itself includes a forward frustroconical section 72 providing an opening 73 therein with an inwardly directed front face 74 having a centrally located hole therethrough. The front face 74 is clamped between the nuts 66, 70 and held in place on the threaded connecting tube 50 which extends through the front face hole, as best shown in FIG. 3. The frustroconical section terminates at its wider end by merging into a concave surface 74 extending in a dish-like manner over a portion of the section 72 in a reverse direction, as indicated in the broken-away view of FIG. 2.

A further conventional coupling member 76 also threads onto the threaded stem 64 and connects the tube 50 to a further flexible tube 78. The coupling member 76 includes an internally threaded nut 80 which threads onto the threaded stem 64, and a tubular member 81 rotatably connected to the nut 80. The tube 78 is fitted over the free end of the tubular member 81, and a clamping band is secured over the end of the tube 78 to secure the tube 78 in position on the free end of the tubular member 81 as shown in FIG. 3.

The tube 78 is flexible to provide an offset portion 84 which can be positioned out of axial alignment with the hollow tube 50, the tube 78 preferably being formed from a plastic or rubber-like material. At the end of the offset section 84, there is again provided a conventional coupling member 86 having the same construction as the above mentioned coupling member 76. The internally threaded nut of the coupling member 86 is threadingly connected to a conventional air compressor unit 88, as shown in FIG. 2. If required, the coupling member 86 could have a male member therein, similar to the above mentioned male member 58, in order to open a piston closed valve sometimes provided in the outlet opening of a conventional air compressor unit.

Figure 4:
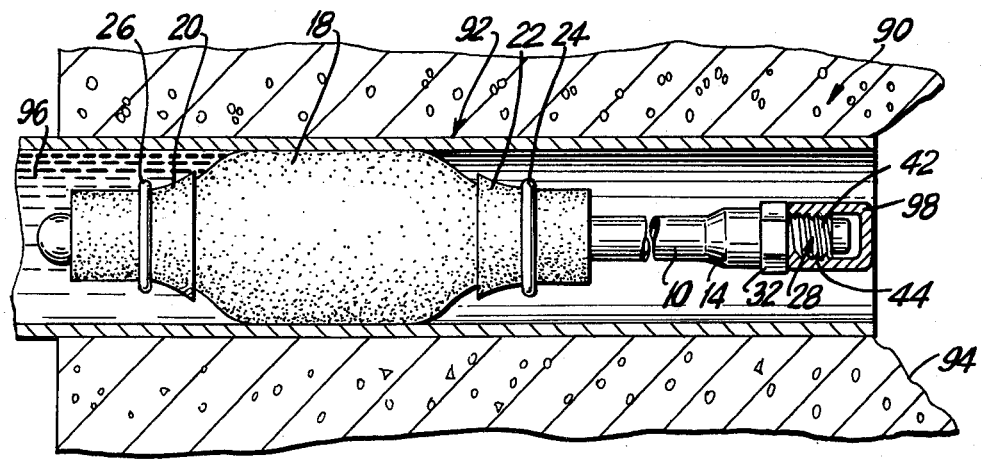
FIG. 4 is a sectional view similar to that shown in FIG. 4, showing the bag inflated and the end of the hollow tube capped.

Referring to FIGS. 3 and 4, when it is desired to seal off a pipe, the surrounding wall 90 which retains the pipe 92 is broken away at its forward portion to form a hole 94 in order to expose the forward end of the pipe. The end sections of the connected apparatus of the present invention, including the hollow tube 10 with the elastic sleeve 18 thereon, are inserted through the exposed forward end of the pipe 92, with the connecting tube 50, the shield 68 and the flexible tube 78 extending outward from the pipe. It should be appreciated, that as all of this connected apparatus is being inserted, there is a continued flow of the fluid 96 out of the pipe. For example, in a water main, the water would continue to flow out of the pipe. However, the water would not harm the individual inserting the apparatus since the water will be deflected away by means of the disk-like guard member 68. In addition, because of the offset portion 84 permitted by the flexible tube 78, as shown in FIG. 2, the individual can stand slightly away from the direct out flow from the pipe, while still holding the end of the flexible tube 78 in the opening 73 of the guard member 68.

The distal end of the connected apparatus has already been connected to an air compressor, as shown in FIG. 2. With the air compressor turned on, compressed air is sent through the connecting tube 50 and into the hollow tube 10 where it flows through the openings 16 and inflates the elastic sleeve 18.

As shown in FIG. 4, the compressed air continues flowing until the elastic sleeve 18 expands to fill the entire width of the pipe 92. As the elastic sleeve 18 expands, it spreads the side belts 20, 22. However, because of the clamping rings 24, 26, the sleeve 18 will not pull out. The belts will slightly flare outwardly along with the sleeve in order to limit the expansion of the sleeve, for the reason set forth above, but the sleeve 18 will not pull out.

After the sleeve 18 has been fully expanded to completely plug up the pipe 92 and stop the flow of the fluid 96 therefrom, the connecting tube 50, together with the shield 68 and the tube 78 are all disconnected from the hollow tube 10 by unthreading the coupling member from the valve housing 42. A cap 98 can then be threaded onto the external thread 44 of the valve member 28 to protect the valve member and prevent any leakage of air therefrom. However, it should be noted that once the connecting tube 50 is disconnected, the male member 58 no longer engages the valve plunger 38, so that the spring 36 biases the valve piston head 38 to close the valve opening 40 to prevent any air from escaping from the inflated sleeve 18.

The sleeve 18, once inflated, will completely plug up the pipe and prevent further flow into the building. The exposed wall hole 94 can then be resealed by placing cement or like material therein, as desired.

The plugging apparatus of this invention finds special utilization in connection with homes that are abandoned. Instead of cutting off the water or gas from the street, a hole can be made in the foundation in the wall of the home, which can later be refilled with cement. The present plugging apparatus can then be placed in the pipe which is exposed in the wall hole to stop the flow. In this manner, if the house is broken into and any of the plumbing is stolen, there will be no danger to the house. At the same time, the property will stay at a high value for further auction or for sale.

Figure 5:
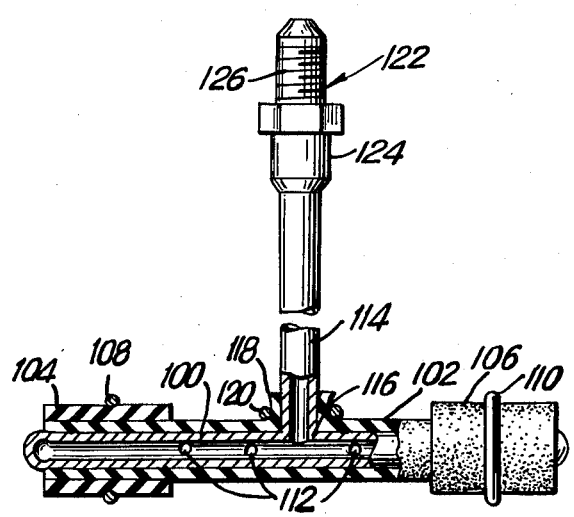
FIG. 5 is a partial sectional view showing another embodiment of the apparatus for use as a permanent installation in a pipe or main.

Referring now to FIG. 5, there is shown another embodiment of the invention, including a hollow tube 100 on which is placed an elastic sleeve 102 which is held in place by means of the elastic bands 104, 106 encircled by the clamping rings 108, 110 in the same manner set forth above. Openings 112 are spaced apart longitudinally along the hollow tube to permit the flow of air from the hollow tube 100 into the elastic sleeve 102 to inflate the elastic sleeve and thereby stop up the pipe.

Extending perpendicularly from the hollow tube is a connecting tube 114 which is joined to the hollow tube at the junction 116. The elastic sleeve has an opening to accommodate the connecting tube 114 and includes a collar 118 surrounding the base of the connecting tube 114. A clamping ring 120 encircles the collar 118 to securely provide an air tight connection around the connecting tube 114. At the distal end of the connecting tube 114 is a valve member 122, the same as the above mentioned valve member 28, which fits into the bell shaped mouth 124 of the connecting tube 114. A threaded end 126 of the valve member 28 extends from the tube 114 on which can be threaded the above mentioned coupling member 46, which is connected to the connecting tube 50, the shield 68 and the flexible tube 78, which will be coupled to the air compressor 88.

The device shown in FIG. 5 can be permanently installed in a street main by placing it inside the main against one wall of the main and extending the connecting tube 114 upwardly from the main to street level. The main is sealed around the connecting tube 114 so that there are no leaks around the main. The sleeve 102 surrounding the hollow tube 100 will lie adjacent one wall of the main and will not interfere with normal flow through the main. Should a break or problem occur in the main so that it is necessary to seal it off, the distal end of the tube 114 extending to the street level is available for attachment, as mentioned above, to an air compressor. The compressed air is sent down through the connecting tube 114 and passes through the hollow tube 100 so as to inflate the elastic sleeve 102 until the inflated sleeve completely blocks off the main and completely plugs it up.

Accordingly, with the embodiment shown in FIG. 5, the device can be permanently installed in each main or pipe and utilized, when necessary, to provide a suitable plug or seal to the main.

The elastic sleeve and the elastic bands thereon are preferably formed from a rubber-like material or suitable plastic. The hollow tube 10, 100, the coupling members and the connecting tube are preferably formed from a suitable metal, however a suitable hard plastic such as polyvinyl chloride can be used instead of the metal. The guard member or shield 68 is preferably formed from a suitable hard plastic.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Apparatus for plugging a pipe comprising:
    an inflatable bag insertable into a pipe in a collapsed condition and inflatable to block any flow within the pipe;
    A hollow tube having at least one closed end, said hollow tube being provided with air input means and air outlet means, said air outlet means of said hollow tube being disposed within said inflatable bag, said air outlet means including at least one opening longitudinally spaced along said hollow tube spaced from said closed end of said hollow tube;
    said inflatable bag including an elastic sleeve surrounding said hollow tube and covering said opening of said air outlet means;
    securing means for connecting said sleeve around said hollow tube, said securing means being disposed on end portions of said sleeve to secure said sleeve on said hollow tube;
    connecting tube means for interconnecting said air input means of said hollow tube to an air compressor for transmission of compressed air through said hollow tube to inflate said sleeve and thereby plug the pipe;
    valve means coupled between said air input means of said hollow tube and said connecting tube means for controlling the flow of air into and out of said sleeve; and
    a band of elastic material overlying each end portion of said sleeve for protecting said sleeve from said securing means and for limiting inflation of said sleeve.

2. An apparatus as in claim 1, wherein said securing means includes a clamping ring disposed on and surrounding each elastic band, said clamping rings being spaced from opposing ends of said sleeve.

3. An apparatus as in claim 1, wherein said closed end of said hollow tube terminates in an enlarged head portion to retain said sleeve on said hollow tube.

4. An apparatus as in claim 1, and further comprising a dish-like guard member positioned along a part of said connecting tube means, said guard member being coaxial with said hollow tube for protection against output flow from the pipe during inflation of said sleeve.

5. An apparatus as in claim 4, wherein said connecting tube means includes a flexible portion upstream of said guard member which can be offset with respect to said hollow tube for maintaining the air compressor out of direct output flow from the pipe.

6. An apparatus as in claim 1, wherein said valve means includes an air valve secured in said air input means at another end of said hollow tube, valve opening means disposed at an end of said connecting tube means, and coupling means for removably coupling said end of said connecting tube means to said air valve so that said valve opening means opens said air valve.

7. An apparatus as in claim 1, wherein a connecting portion of said hollow tube extends perpendicularly with respect to a body portion of said hollow tube, said sleeve surrounding said body portion with said connecting portion being disposed between said sleeve end portions, sealing means for sealing said sleeve at a junction of said connecting portion and said body portion of said hollow tube, said air input means being disposed at a distal end of said connecting portion.

8. An apparatus as in claim 7, wherein said valve means includes an air valve secured in said distal end of said connecting portion.

9. An apparatus as in claim 4, wherein said dish-like guard member has a concave surface facing said sleeve, and a frustroconical section coaxial with said hollow tube, a narrow end of said frustroconical section facing said sleeve to provide a wide opening therein facing away from said sleeve.

10. An apparatus as in claim 1, wherein said air outlet means includes a plurality of openings longitudinally spaced apart along said hollow tube.

* * * * *